US012551261B2

(12) United States Patent
Neugebauer et al.

(10) Patent No.: US 12,551,261 B2
(45) Date of Patent: Feb. 17, 2026

(54) DEVICE AND METHOD FOR TISSUE IDENTIFICATION

(71) Applicant: Erbe Elektromedizin GmbH, Tuebingen (DE)

(72) Inventors: Alexander Neugebauer, Moessingen (DE); Sascha Dammeier, Tuebingen (DE)

(73) Assignee: ERBE ELEKTROMEDIZIN GMBH, Tuebingen (DE)

( * ) Notice: Subject to any disclaimer, the term of this patent is extended or adjusted under 35 U.S.C. 154(b) by 526 days.

(21) Appl. No.: 18/073,778

(22) Filed: Dec. 2, 2022

(65) Prior Publication Data

US 2023/0172651 A1 Jun. 8, 2023

(30) Foreign Application Priority Data

Dec. 3, 2021 (EP) ..................................... 21212316

(51) Int. Cl.
*A61B 18/12* (2006.01)
*A61B 5/00* (2006.01)
(Continued)

(52) U.S. Cl.
CPC ........ *A61B 18/1206* (2013.01); *A61B 5/0075* (2013.01); *A61B 5/7221* (2013.01);
(Continued)

(58) Field of Classification Search
CPC ........ A61B 18/1206; A61B 2018/1213; A61B 2018/00904; A61B 2018/00648; A61B 5/7221; A61B 5/0075
See application file for complete search history.

(56) References Cited

U.S. PATENT DOCUMENTS 6,026,323 A 2/2000 Skladnev
2005/0203504 A1* 9/2005 Wham ............... A61B 18/1442
606/34

(Continued)

FOREIGN PATENT DOCUMENTS

DE 4231677 1/1993
DE 19860689 8/2000
(Continued)

OTHER PUBLICATIONS

International Extended Search Report for European Application No. 21212316.0-1113, dated May 27, 2022; 10 pages.
(Continued)

*Primary Examiner* — Sean W Collins
(74) *Attorney, Agent, or Firm* — Fitch, Even, Tabin & Flannery LLP (57) ABSTRACT

A theragnostic system includes a surgical station and a storage and processing device that contains data in a suitable storage in which patient data and treatment data, e.g. in form of electrical and optical features, are combined. The electrical features are derived from electrical parameters of the voltage and the current with which an instrument is supplied. The optical features are derived from light of the spark that is produced upon influencing the tissue. By combining electrical and optical features in a data collection, that even contains additional features, such as tissue features and patient characteristics, it can be determined whether the instrument influences benign or malign tissue. The prediction accuracy can be increased by machine learning by adding histological data to the data sets. These data can be collected in a cloud computing system that is connected with many surgical stations.

15 Claims, 4 Drawing Sheets

(51) Int. Cl.
*G16H 50/20* (2018.01)
*A61B 17/00* (2006.01)
*A61B 18/00* (2006.01)

(52) U.S. Cl.
CPC .... *G16H 50/20* (2018.01); *A61B 2017/00061* (2013.01); *A61B 2018/00642* (2013.01); *A61B 2018/00648* (2013.01); *A61B 2018/00875* (2013.01); *A61B 2018/00904* (2013.01); *A61B 2018/1213* (2013.01)

(56) References Cited

U.S. PATENT DOCUMENTS

| | | | |
|---|---|---|---|
| 2007/0213704 | A1 | 9/2007 | Truckai |
| 2009/0326383 | A1 | 12/2009 | Barnes |
| 2012/0156712 | A1 | 6/2012 | Takats |
| 2012/0296238 | A1* | 11/2012 | Chernov .................. A61N 7/02 601/2 |
| 2014/0378961 | A1* | 12/2014 | Fischer .............. A61B 18/1233 606/34 |
| 2015/0381908 | A1 | 12/2015 | De Bruijn et al. |
| 2019/0223728 | A1 | 7/2019 | Heidari |
| 2020/0197072 | A1* | 6/2020 | Watson .................. A61B 34/74 |
| 2021/0228260 | A1* | 7/2021 | Canady, Jr ......... A61B 18/1206 |

FOREIGN PATENT DOCUMENTS

| | | |
|---|---|---|
| DE | 10392791 | 5/2005 |
| DE | 102020105853 | 5/2020 |
| EP | 0650694 | 5/1995 |
| EP | 2491882 | 8/2012 |
| EP | 2659846 | 11/2013 |
| EP | 3319313 | 5/2018 |
| WO | 0219243 | 3/2002 |
| WO | 03020119 | 3/2003 |
| WO | 2011055369 | 5/2011 |

OTHER PUBLICATIONS

Hillebrand, B. et al., "Tissue Differentiation Using Optical Emission Spectroscopy for Gastric Mucosal Devitalisation", Journal of Physics D: Applied Physics, Institute of Physics Publishing, Bristol, GB, Bd. 54, Nr. 26, Apr. 23, 2021; 11 pages.

Russian Patent Office; Office Action and Search Report in corresponding Russian Patent Application No. 2022 130 909, dated Dec. 1, 2025; 10 pages.

* cited by examiner

| P | | | | E | | | | O | | | | K | | | | T | | | | L |
|---|---|---|---|---|---|---|---|---|---|---|---|---|---|---|---|---|---|---|---|---|
| $P_1$ | $P_2$ | ... | $P_n$ | $E_1$ | $E_2$ | ... | $E_n$ | $O_1$ | $O_2$ | ... | $O_n$ | $K_1$ | $K_2$ | ... | $K_n$ | $T_1$ | $T_2$ | ... | $T_n$ | |
| X | X | | | | | | | | | | | | | | | X | | | | m |
| | X | | | | | | | | | | | | | | | X | | | | m |
| | X | | | | | | | | | | | | | | | X | | | | b |
| | X | | X | | | | | | | | | | | | | | X | | | |
| X | | | X | | | | | | | | | | | | | | X | | | |
| | | | X | | | | | | | | | | | | | | | | | |
| | | | | | | | | | | | | | | | | | | | | |
| | | | | | | | | | | | | | | | | | | | | |
| | | | | | | | | | | | | | | | | | | | | |

DEVICE AND METHOD FOR TISSUE IDENTIFICATION

CROSS REFERENCE TO RELATED APPLICATION

This application claims the benefit of European Patent Application No. 21212316.0, filed Dec. 3, 2021, which is incorporated herein by reference in its entirety.

TECHNICAL FIELD

The invention refers to an integrated therapy and diagnosis system (theragnostic system) for treatment (therapy) and tissue identification (diagnostic). Particularly, the invention refers to a theragnostic system for recognition of tissue features, particularly benignancy or malignancy thereof during a surgical intervention. Further, the invention refers to a method for assessment of data before, during and/or after surgery for gaining information about the treated tissue.

BACKGROUND

A device is known from EP 2 659 846 B1 comprising a surgical instrument having an electrode that is connected to a generator, which supplies the electrode with radio frequency alternating voltage. A spark from which light originates is maintained between the electrode and biological tissue. This light is received by means of a light receiving device and is supplied to an analysis device that carries out a spectral analysis. From the created spectrum, optionally also by means of pattern recognition and by means of comparison with light features stored in the data base, it can be concluded whether the tissue is harmless, benign tissue or degenerated, malign tissue. This can be indicated to the surgeon.

In addition, a medical instrument for cold ablation of tissue by means of very short radio frequency sparks is known from US 2007/0213704 A1. The light originating from the spark is supplied to a spectral analyzer in order to create control signals and to allow a tissue distinction based on the detected spectra.

WO 2011/055369 A2 discloses a catheter for plaque ablation from blood vessels. The spark used for ablation of plaque creates light that is supplied to a sensor via an optical fiber. This sensor detects the phosphor line in order to distinguish plaque from living cells.

A network is apparent from EP 3 319 313 A1 that is configured to combine data of multiple points. Camera images and other sensor data as well as data about the circumstances of a medical treatment are part of the data.

Additional prior art is apparent from DE 103 92 791 T5, DE 198 60 689 C2, US 2009/0326383 A1, DE 42 31 677 A1, WO 02/19243 A2, U.S. Pat. No. 6,026,323, WO 03/020119 A2, EP 0 650 694 A1, DE 10 2020 105 853 A1 and US 2019/0223728 A1.

During the practical realization of the tissue recognition by analysis of the light originating from a spark, uncertainties occur that make reliable tissue recognition difficult.

SUMMARY

It is one object of the invention to improve an automatic tissue recognition at and during the surgical influence on biological tissue.

This object is solved by means of the device and the method as disclosed herein.

The device according to the invention comprises a surgical station as well as a storage and processing device for processing of data gained in the surgical station. The storage and processing device can be part of the surgical station or can be a separate device arranged remote from the surgical station that is in connection with the surgical station via a transmission network. The device can particularly comprise also multiple surgical stations that are connected or can be connected with the common storage and processing device by means of a data transmission device, e.g. a network.

At least one electrosurgical instrument suitable to influence biological tissue in a surgical manner is part of the surgical station. For this purpose the instrument comprises at least one electrode. In addition, at least one generator for supply of the instrument, particularly its electrode, with an electrical current suitable for producing the surgical effect, typically a radio frequency current having a frequency above 100 kHz, preferably 300 kHz or more, is part of the surgical station. The voltage provided by the generator and supplied to the electrode of the instrument is typically in a range of more than 100 volts up to multiple 1000 volts and is, like the current, high-frequent. The radio frequency voltage can be subject to selectable modulations in order to achieve different surgical effects. In addition, different other parameters, such as power, maximum amount of current, modulation and the like, can be adjusted. Such presets of the generator for producing different surgical effects are denoted as "modes".

In addition, a detection device is part of the surgical station that is configured to receive light emitted from the spark created between the electrode and the tissue. This light is supplied to a light analysis device that is also part of the surgical station and that is configured to detect at least one optical feature of the received light. The optical feature can be particularly a spectral feature, e.g. a characteristic spectrum, a characteristic spectrum portion, a single wavelength of a characteristic spectrum or one or more parameters derived from the spectrum. The surgical station further comprises a detection device for production of an electrical feature. The electrical feature can be the amount of the current, the fluctuation of the current, the voltage applied at the electrode, the fluctuation of the voltage, the modulation of the current and/or the voltage, the resulting crest factor, the impedance of the tissue, the impedance of the series circuit consisting of the tissue resistance and the spark resistance, the power input, the energy input, the phase angle between current and voltage or a calculation parameter derived from one or more of these parameters.

The optical features as well as the electrical features are provided to the storage and processing device. From the optical features, and if necessary additionally or alternatively from the electrical features, the storage and processing device determines a tissue label by comparison with available data and transmits the tissue label to the output device of the surgical station in order to indicate it there. For determination of the tissue label, i.e. for tissue identification, the system according to the invention uses primarily the optical features. If on the exclusive basis thereof reliable tissue identification is impossible, the system uses additionally or alternatively (secondarily) the electrical features. In doing so, the tissue identification is remarkably more reliable and usable in a wider range than in the case of using exclusively optical or exclusively electrical features.

The tissue label is a signal that indicates whether the treated tissue, which is in contact with the spark is malign or benign tissue. The output device can be an optical, acoustical or tactile output device in order to signal to the surgeon or another treating person whether the electrode is interacting with benign or malign tissue. In case of a tumor resection, he therefore gains information whether he cuts inside the tumor or outside a tumor. In that the storage and processing device considers not only optical features for tissue characterization, but also electrical features and indeed, particularly electrical features that are closely related with the spark, the tissue distinction can be more selective and more accurate, as known from the prior art.

The light analysis device preferably comprises a spectral analysis device that is configured to determine the spectrum, parts of the spectrum or a parameter derived from the spectrum or from portions of the spectrum as optical feature. For this purpose the surgical station can comprise a local processing device. If the storage and processing device in which reference spectra are stored is provided externally from the surgical station, the determination of the optical feature is carried out locally and only the optical feature, but not the entire spectrum is transmitted to the remote storage and processing device. This reduces the data transmission effort and therefore increases the reaction speed of the entire system.

In addition, the spectral analysis device can comprise a quality estimator, which assesses the reliability of the produced optical feature and assigns the produced assessment to the optical feature. The quality estimator uses a quality criterion for assessment of the produced optical feature. The quality criterion can depend from the manner how the optical feature is produced. For example, the optical feature can evaluate one or more spectral lines or spectral ranges as well as particularly their maximum intensities, i.e. peaks, that stand out from the background noise. For example, typical peaks can be a calcium line, the magnesium line, the zinc line or bands that are based on molecule fragments, e.g. CN, $N_2^+$, CH, CC, NH etc. If such spectral lines or peaks stand out from the background noise only faintly, the produced optical feature that is based on these peaks has only low quality. However, if the searched lines stand out clearly, the optical feature has high quality. The quality criterion provided by the quality estimator can be a digital signal (valid/unvalid) or also an analog signal, e.g. a value between 0 and 1 that can be used for evaluating the significance of the optical feature.

In a preferred embodiment the storage and processing device is configured to define the tissue label with reduced consideration or without consideration of the optical feature based on the electrical feature, if the quality criterion indicates a low or missing reliability of the optical feature. In doing so, even with inferior (i.e. with low characteristic) spectra, a tissue distinction is still possible. In addition, the storage and processing device can be configured to provide a warning signal that can be transmitted to the surgical station and output there in the output device in order to point to the treating person that the reliability of the output tissue label is reduced.

The system according to the invention can be configured as self-learning system that is able to combine different data to a data collection. For example, an input device can be provided in the surgical station via which the type of the tissue to be treated (e.g. muscle tissue, fat tissue, lung tissue, organ tissue, such as liver tissue, kidney tissue, etc.) can be input to the storage and processing device. The input device can be additionally provided and configured to record additional data, e.g. meta data, such as patient data, and to forward it to the storage and processing device. The input device is configured for input of specific data, in that it displaces specific input masks for the data in which the respective data can be inserted or imported.

The storage and processing device can be in addition configured to record the optical and electrical features produced during surgery. In addition, the input device can be configured such that a histological finding can be input that is submitted to the storage and processing device and linked with the optical and electrical features. The emerging raw data set can then be verified by the storage and processing device during additional uses and finally used as reference data set for tissue identification in subsequent surgeries. The data sets can be provided specifically for individual patients or also for specific types of patients or classes. Types of patients or classes can be defined according to gender, age, weight, general condition, pre-existing health problems, substance addiction or similar criteria.

A respective input device can also be provided external from the surgical station in order to use laboratory data for filling the data base. For example, explanted tissues can be examined histologically and can be treated for test purposes with an electrical instrument in the laboratory in order to determine the electrical and optical features produced thereby and to store them in the data base.

It is in addition possible to control the operation of the generator with regard to at least one operating parameter based on the optical feature. For example, thus the voltage, the current, the modulation type, the modulation depth, the pulse pause ratio in case of pulse pause modulation, the crest factor, the power input and/or the energy input into the biological tissue can be controlled. It is thereby particularly possible to control the generator so that the optical features have the highest possible quality so that a good reliability of the finding resulting from the optical and electrical features is provided.

It is also possible to control the generator based on demands of the surgeon for producing the desired surgical effect, whereby it is, for example, in a first operating mode. It can happen that the optical feature can only be produced in low quality in this operating mode. Thereby it can be provided in addition that the system is configured to operate the generator during a short period in a second operating mode that is not demanded and adjusted by the surgeon, in which however the optical feature comprises high quality. The switch over in this operating mode is carried out preferably during such a short period that the surgeon subjectively does not recognize a modified behavior of the instrument guided by him or at least no significantly modified behavior with regard to the surgical effect on the tissue desired by him. In the second operating mode electrical parameters, such as the voltage, the current, the power, the crest factor, the wave form or similar can be modified during a short period, i.e. for less than 100 milliseconds, preferably less than 10 milliseconds and even further preferably less than 1 millisecond. The variation is preferably a variation that results in an improved significance of the created spectrum. The generator can be configured to carry out this modification periodically or from time to time based on an event.

The system according to the invention allows the link of a surgical station with a theragnostic cloud. In the surgical station optical features are produced by means of a light analysis device and provided to the cloud. In the latter an integrated self-learning data analysis is carried out. Thus, the surgical station and the action of the surgeon can be monitored and can be adapted dynamically, in the best case patient-specific. Also a surgery robot can be completely or partly automatically controlled. Central as well as local input and annotation systems can be used as data source. The cloud-based theragnostic system comprises a cloud-based data storage having a data processing unit that is based on machine learning. The data storage regularly receives optical emission spectra, bio impedance data and/or further electrical data from clinically relevant tissues with associated histopathological or another additional identification from local data bases or directly from the surgical station. In addition, the OES cloud (Optical Emission Spectroscopy cloud) receives individual data, i.e. electrical data, bio impedances, optical emission spectra from surgeries from operating rooms. In case of surgeries with RF surgery, the system continuously determines data from peripheral apparatus, such as surgery cameras, operation room robotics as well as sensor and imaging systems and/or diagnostic imaging, such as ultrasonic, optical coherence tomography, diffuse electrical tomography, impedance tomography, elastography or the like, either directly or by means of an operation room management system. In addition, the system may identify accumulation of invalid system data, particularly RF surgical system data that are required for undisturbed theragnostic. If invalid system data are determined frequently or for a longer period, a respective alarm signal may be output. The tissue recognition is improved continuously by continuous data input and classification thereof for the diagnostic based on the electrical and optical features. This can be carried out by machine learning algorithms. From the produced electrical and optical features control parameters for robot-supported surgery can be produced and submitted live to terminal devices. In addition, the storage and processing device can maintain a library of electrical and optical features in connection with tissue features and patient characteristics and can propose optimum adjustments of the generator (RF adjustments) for ongoing interventions. Thus, a personalized medicine is possible.

BRIEF DESCRIPTION OF THE DRAWINGS

Details of the theragnostic system according to the invention can be derived from the description of the following embodiments with the aid of the drawing having the following figures.

DETAILED DESCRIPTION

Figure 1:
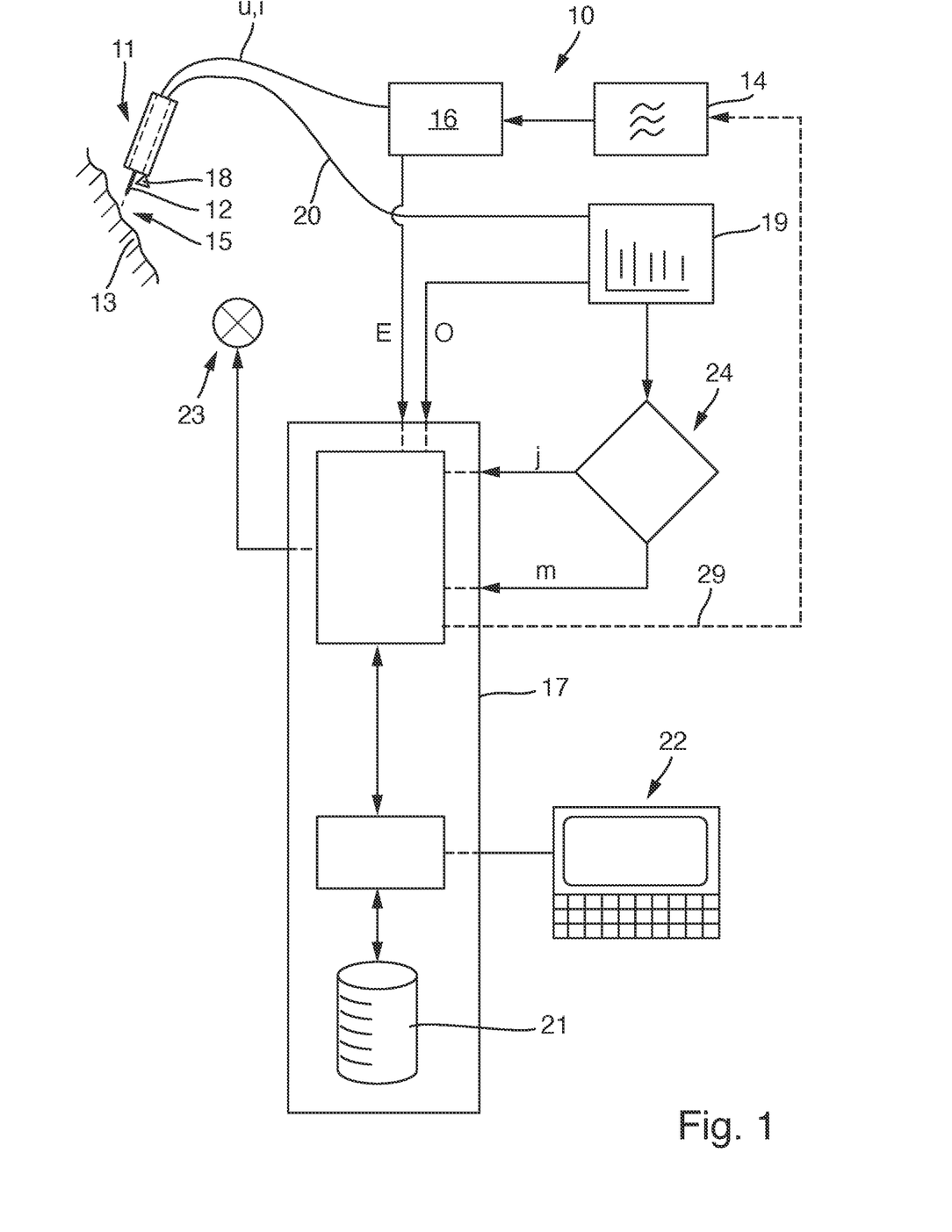
FIG. 1 is a simple local theragnostic system in schematic overview illustration.

FIG. 1 shows a surgical station 10 particularly with regard to data acquisition and processing in a very schematic illustration. The surgical station 10 comprises the not further illustrated components of an operation room. Particularly it comprises a surgical instrument 11 having an electrode 12 for influencing biological tissue 13 during a surgical intervention. The electrode 12 of instrument 11 is supplied with treatment voltage u and treatment current i from a generator 14 that is supplied to the instrument 11 via a line. The treatment voltage u and the treatment current i are preferably high-frequent having a frequency of above 100 kHz, e.g. 300 or 400 kHz or in another suitable frequency. The treatment voltage u and the treatment current i are preferably provided, so that a spark 15 is produced at the electrode 12 that interacts with the tissue 13 and that produces a desired surgical effect at the tissue 13, such as a coagulation, a cut or another effect.

The generator 14 supplies the treatment voltage u and the treatment current i via a detection device 16 that determines at least one electrical feature E. Such an electrical feature E can be the treatment current, the treatment voltage, the frequency of the treatment voltage or the treatment current in case of variable treatment voltage frequencies, the degree of modulation of the treatment voltage, the modulation type of the treatment voltage, the pulse/pause ratio in case of pulse/pause-modulated treatment voltage or treatment current, the tissue impedance, the non-linearity of the spark impedance, a spark sensor value that results, for example, from the measured direct current portion of the real alternating voltage or a combination of these parameters or a parameter derived from a combination of one or more of these parameters. The electrical feature E can also comprise multiple of such parameters. It is provided to a storage and processing device 17.

The surgical station 10 comprises in addition a light receiving device 18 that is particularly configured to receive the light emitted from the spark 15. The light receiving device 18 can be part of instrument 11 or can also be realized separately therefrom. The light receiving device 18 is connected with a light analysis device 19 that can be part of instrument 11 or alternatively, as schematically indicated in FIG. 1, can be connected with the light receiving device 18 via an optical fiber 20. The light analysis device 19 is configured to determine one or more optical features O from the captured spark light.

The optical feature can be produced by spectral analysis and/or evaluation of the spectral analysis of the spark light. The optical feature can be the spectrum itself, i.e. optical signals or data that represent the spectrum of the spark light or a spectrum portion thereof. The optical feature O can comprise multiple individual features, $O_1, O_2, \ldots O_n$, for example, that are provided to the storage and processing device 17. Also, the electrical feature E can comprise a number of electrical individual features $E_1, E_2, E_n$. The optical individual features $O_1, O_2, \ldots O_n$ can be, for example, the intensities of specific wavelengths $\lambda_1, \lambda_2, \ldots \lambda_n$ that occur in the spectrum S of the spark light. The optical individual features $O_1, O_2, O_n$ can be based on specific emission lines of characteristic chemical elements, such as atom emission lines of calcium, magnesium, zinc or also emission lines, emission bands or spectrum portions of characteristic molecule fragments, such as CN, $N_2^+$, CH, CC, NH etc.

Figure 4:
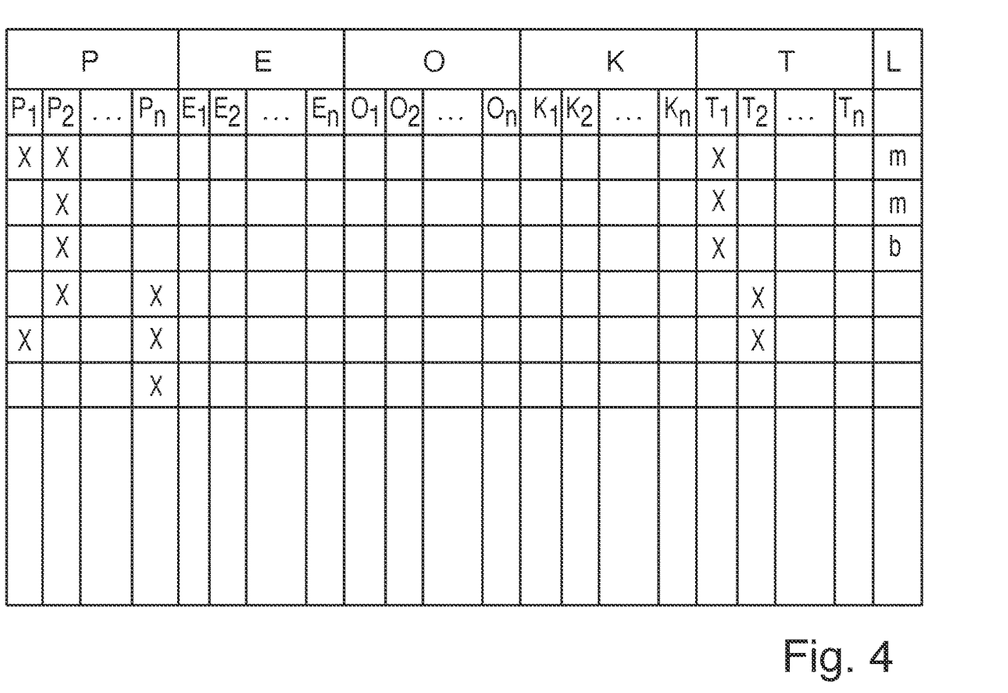
FIG. 4 is an illustration of a data collection for determination of tissue features.

The storage and processing device 17 comprises a mass storage 21 that stores data provided from one or more surgical stations 10 in an ordered manner. For example, the data can be organized according to a table as indicated in FIG. 4. In this table electrical features E as well as optical features O have been included. They can be assigned to different patients P ($P_1, P_2, P_3 \ldots P_n$) and different tissue types T ($T_1, T_2, T_3 \ldots T_n$). The patients $P_1$ to $P_n$ can be individual patients or specific patient groups that are sorted according to common features, e.g. according to age, weight, body fat percentage, status of disease or similar. The table according to FIG. 4 can have additional entries that are not indicated there.

For creating a data set according to the table of FIG. 4 in the mass storage 21, the storage and processing device 17 can be connected with an input unit 22 by means of which disease characteristics K ($K_1, K_2 \ldots K_n$) can be assigned to the patients or patient groups as well as the electrical features E and optical features O occurring during a surgical influence on the tissue 13. In addition, a label L can be assigned to each data set that indicates whether malign tissue m or benign tissue b is present. Respectively one line in the shown table in FIG. 4 is considered as data set. As already mentioned, the table can however comprise more columns and lines than illustrated and can comprise remarkably more data, e.g. the used instruments and apparatus, adjustments of the apparatus, treating persons etc.

Figure 3:
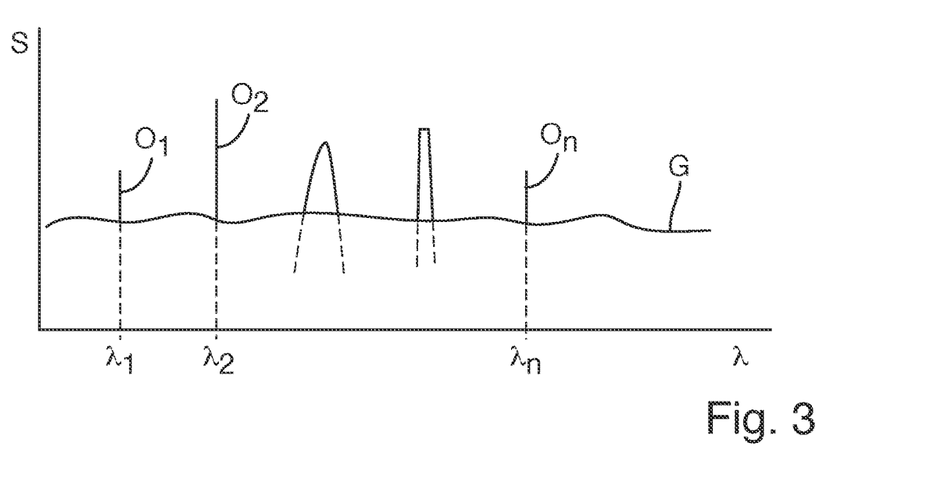
FIG. 3 is a spectrum for producing optical features.

In addition, the storage and processing device 17 can be connected with a display and/or acoustic device 23 that indicates a hint to the surgeon about the label of the tissue contacted by the spark 15. In addition, the storage and processing device 17 can comprise an estimator 24 or can be connected with the latter, which is for its part connected with the light analysis device 19 and receives therefrom either the optical features O or another signal that in any case characterizes the significance of the optical features O. The estimator can characterize, for example, the signal/noise distance or the signal/noise ratio between a background noise G apparent from FIG. 3 and the individual optical features $O_1$, $O_2$ to $O_n$. If all or individual optical features $O_1$ to $O_n$ cannot be sufficiently distinguished from the background noise G, the reliability of the optical features O decreases remarkably and can drop down to zero.

The estimator 24 provides a respective signal to the storage and processing device 17, in the simplest case illustrated in FIG. 1 a yes-no-signal.

Instead of the signal/noise ratio the estimator can also define a signal/signal ratio in which two or more optical features of the recorded spectrum are considered in relation to one another. If this ration falls below or exceeds a predefined limit value or is inside a predefined interval, the spectrum is evaluated as valid or invalid.

In a simple variant the estimator 24 can also only use the intensity of one or multiple optical features for evaluating the quality. The intensity can thereby be a maximum value of the optical feature as well as the integral of the optical feature in a defined wavelength range. If the determined value is above or below a previously defined limit value or inside a previously defined range, the spectrum is evaluated as being valid or invalid.

The estimator 24 can also be configured to check the presence of specific optical features that indicate an interaction with non-biological material. Particularly, the optical features of metals are suitable for this in order to characterize unintentional interactions with other surgical apparatus, e.g. metallic clamps, and to evaluate these spectra as invalid.

In addition, estimators 24 of another type can be used. For example, the estimator 24 can be configured to compare the detected spectrum with many different spectra being part of a sample stock. This can be carried out by pattern matching, cross-correlation analysis, similarity analysis or other methods. The estimator 24 can be configured to characterize the captured spectrum as being not reliable, if it is not correlated or similar to any of the provided sample spectra.

Also the possibility exists that the estimators that have been discussed individually here are combined in an arbitrary manner with one another in order to increase the quality of the assessment.

The surgical station 10 described so far operates as follows, for example:

First, the specific patient or the affiliation of the patient to a patient group $P_1$ or $P_2$ . . . or $P_n$ has been indicated to the storage and processing device 17. This indication can be carried out by an identifier attached to the patient, a barcode, a number, a patient card or also by manual input of a patient identification, e.g. a name, by means of the input device 22. For example, it is assumed that the patient is part of the patient group $P_2$ that is part of the illustration in FIG. 4. This means that for this patient only those data sets are worth considering that are assigned to his patient group. If now the surgery starts, the electrical features E as well as the optical features O are determined. In addition, at least as an option, the tissue type which is influenced, e.g. lung tissue $T_1$, can have been input. This means that in this example according to FIG. 4, only the first three data sets (the first three lines) are worth considering in the subsequent analysis. Now the electrical features E and the optical features O are detected and compared with the table of FIG. 4, wherein in practice it contains remarkably more lines and data sets as illustrated. Based on the individual electrical features $E_1$ to $E_n$ and optical features $O_1$ to $O_n$ it can now be concluded with relatively high reliability whether the tissue contacted by spark 15 has to be provided with a malign label m or a benign label b. A corresponding indication can then be made by the indication device 23.

In addition, particularly with large amounts of data and data sets, additional constraints, such as diseases $K_1$ to $K_n$, or additional influence parameters, can be considered and thus entered into the data sets according to FIG. 4.

It is possible to indicate the histological finding of the tissue to the system according to FIG. 1 during surgeries and thus to create additional data sets that create a connection between the electrical features E, the optical features O and the associated label L respectively. In doing so, the system can learn more and more with increasing period of use and can refine its predictions.

In addition, due to the estimator 24, the system can be kept from making wrong proposals on a basis of uncertain optical features O. If the reliability of the optical feature O decreases or if it is finally not existing, the system, i.e. the storage and processing device 17, can still output a valid label L (namely m or b) with some reliability exclusively based on the electrical features E in the context with the other present features.

Figure 2:
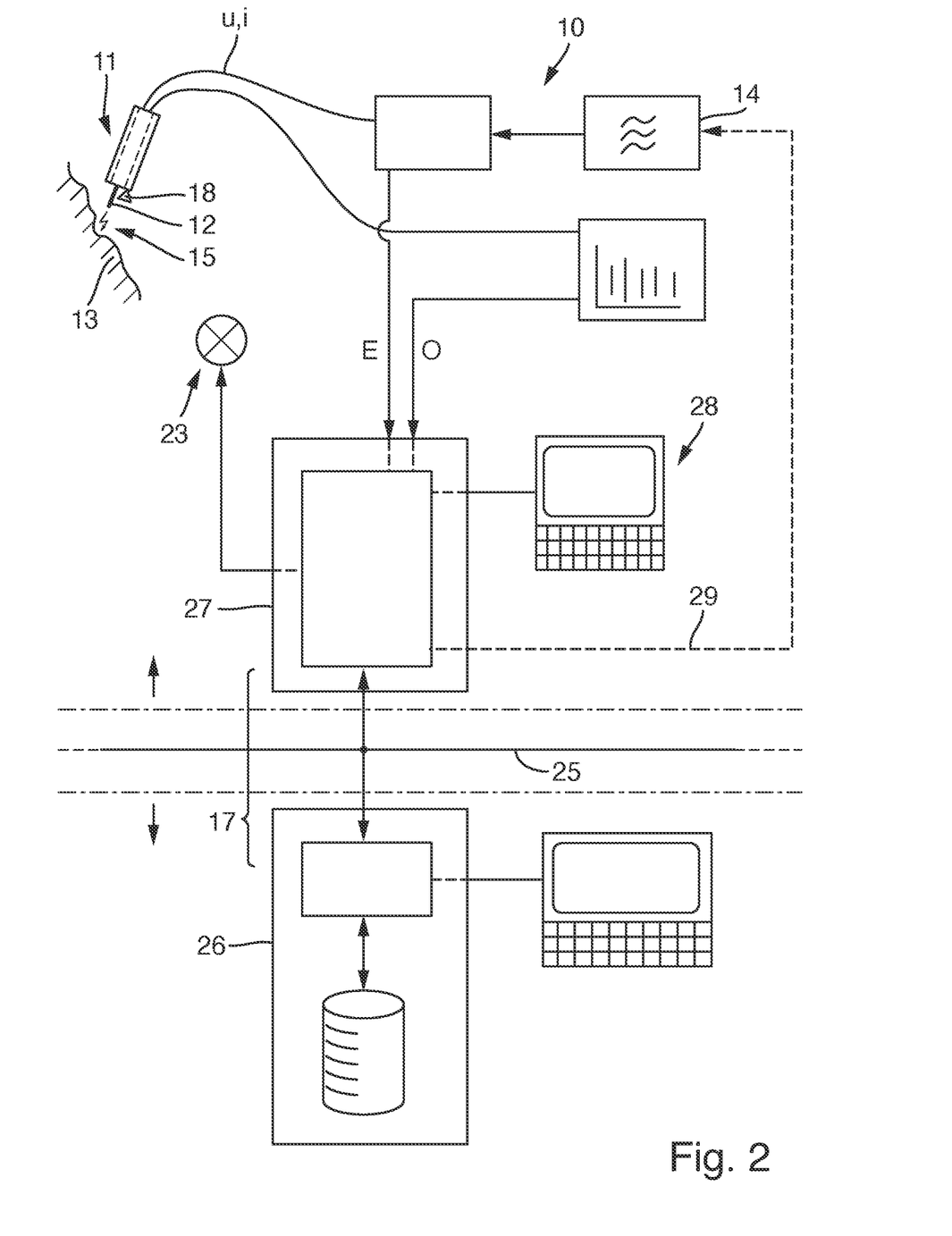
FIG. 2 is a cloud-based theragnostic system in an overview illustration.

The system 10 described so far can comprise also multiple surgical stations 10 according to FIG. 2 that are connected with a centralized part of the storage and processing device 17, denoted as cloud 26, via a data remote connection 25. The part of the storage and processing device 17 remaining in each surgical station 10 is realized by a local processing device 27. In the present embodiment the local processing device 27 also comprises an input device 28 by means of which inputs, e.g. about the patient, its status of disease, histological findings or the like can be made in the surgical station 10. A processing device 27 communicates these indications entirely or partly to the cloud 26. Also the processing device 27 communicates the electrical and optical features E and O entirely or partly to the cloud 26. The received patient characteristics as well as the electrical and optical features E, O are analyzed in the cloud 26 based on the data collection according to FIG. 4 and a respective label for characterization of the benignancy or malignancy of the treated tissue is supplied back to the processing device 27. The result can be optically or acoustically or tactilely brought to the attention of the surgeon.

The surgical station according to FIG. 1 alone or the surgical stations 10 according to FIG. 2 in connection with the cloud 26 define a theragnostic system that supports the therapy as well as the diagnostic.

The surgical station 10 according to FIG. 1 or FIG. 2 can in addition comprise a feedback between the storage and processing device 17 and the generator 14. For example, electrical parameters of generator 14, such as the power transfer from the instrument 11 to the tissue 13, the voltage, the current, the modulation shape, the wave shape of the voltage or the current or other electrical parameters can be varied dependent on the determined electrical and/or optical features E and/or O. For example, this is to avoid wrong treatments or to improve diagnostic possibilities. For example, system 10 can be configured to switch off the generator 14 or to control it to another, e.g. also higher, power level in case of determination of a contact of malign tissue. Also the system 10 can be configured to modify the electrical parameters permanently or temporarily or also only for a very short period and sporadically or repeatedly so that the significance of the optical features O increases. For example, in a first mode M1 in which the significance of the optical features O is low, it can be switched to another mode M2 for a very short period, e.g. some milliseconds, that provides a higher significance of the optical features O. The switchover can be effected by means of a voltage variation or a modulation change for a short period. The feedback 29 provided for this purpose is particularly effective, if in the data set according to FIG. 4 also an indication K associated with the electrical features E and the optical features O is stored that characterizes the reliability of the optical features O.

Figure 5:
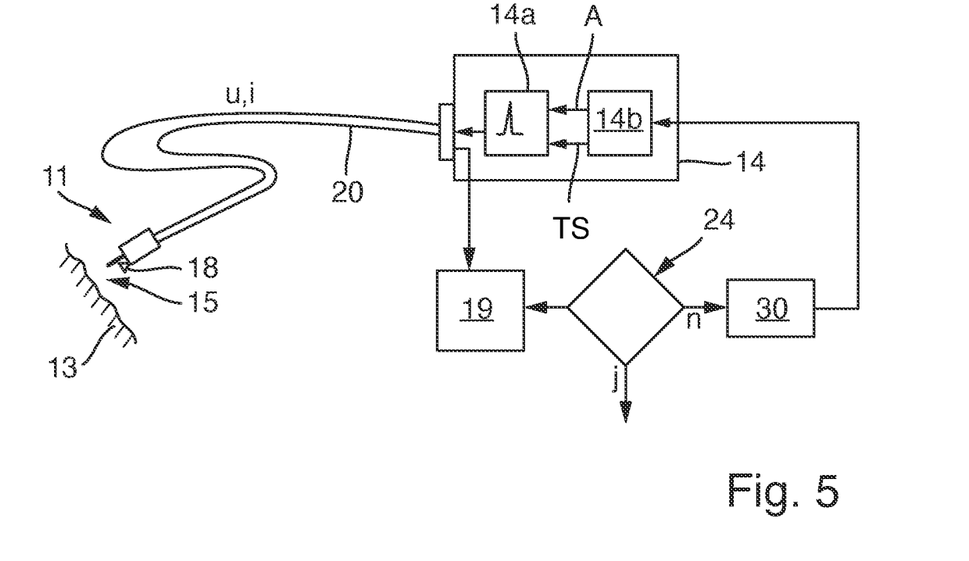
FIG. 5 is a theragnostic system having an improved generator.

FIG. 5 illustrates essential parts of a generator 14 of a surgical station, the generator being configured to improve the quality of the optical signals characterizing the tissue. This generator 14 is in turn configured for operation of instrument 11 that on one hand produces a surgical effect by means of the spark 15 influencing the tissue 13 and on the other hand creates light that is supplied to the light analysis device 19 via the light receiving device 18 and the line 20.

The particularity of generator 14 according to FIG. 5 is that it is configured to output individual impulses $I_1$, $I_2$, $I_3$, $I_4$, $I_5$, $I_6$ . . . together forming a monopolar or bipolar RF oscillation. For this purpose generator 14 is separated into an impulse generator 14a and a clock 14b that provides a clock signal TS triggering each individual impulse $I_1$ to $I_6$ . . . to the impulse generator 14a on one hand. On the other hand the clock 14b is configured to provide an amplitude signal A to the impulse generator 14a that defines the amount of the respectively created individual impulse $I_1$ to $I_6$ . . . The impulse generator can comprise one or more flyback converters that can be triggered respectively concurrently or at different points in time to output an output impulse and that output one single output impulse upon receipt of a clock signal. Due to concurrent output of multiple output impulses by means of multiple flyback converters, higher output impulses are created, because the output impulses of the individual flyback converters are added.

The clock 14b is thereby configured to define the clock signal TS and the amplitude signal A so that the desired surgical effect is produced. For example, if an RF impulse sequence with constant amplitude A shall be created, a sequence of clock signals TS is supplied to the impulse generator 14a at a constant amplitude signal A. If the desired surgical mode, however, requires an interrupted impulse sequence with impulses of constant amplitude, a respectively interrupted sequence of clock signals TS is supplied to the impulse generator 14a at a constant amplitude signal A.

Figure 6:
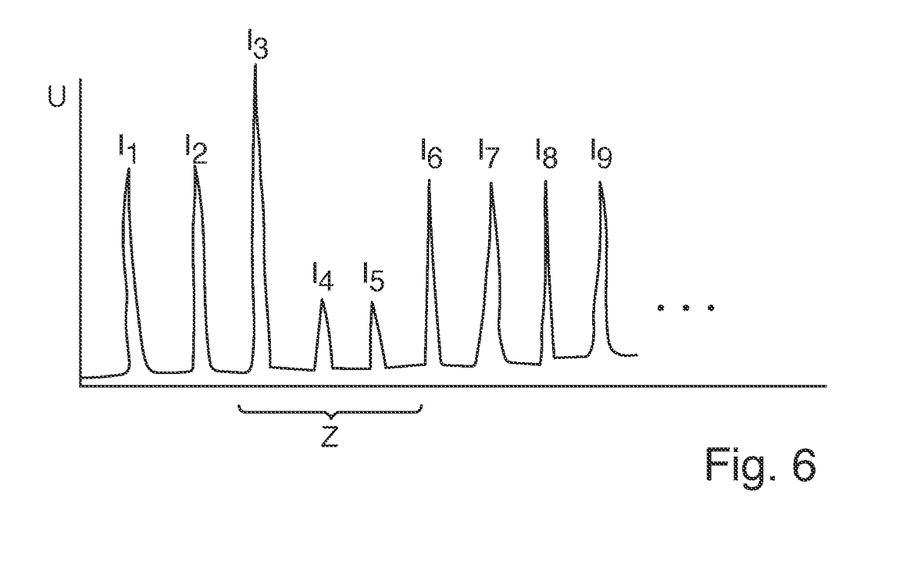
FIG. 6 shows generator impulses of the generator according to FIG. 5.

The particularity of generator 14 illustrated in FIG. 5 is its connection to the light analysis device 19 and the estimator 24. Both can operate according to any of the principles described above. The estimator 24 is, however, in addition connected with a mode catalog storage in which mode data sets are stored that characterize different impulse sequences $I_1$ . . . $I_6$ . . . that are part of different treatment modalities. Particularly, the mode catalog storage 30 contains an identifier for each stored mode data set that indicates to what extent the associated impulse sequence is suitable to provide a spectrum that can be evaluated. Particularly, in the mode catalog storage data for such impulse sequences $I_3$ to $I_5$ are stored that result in spectra of significance. For example, it may be that the surgeon desires a treatment modality that results in insufficient significant spectra. In the example this is illustrated by a sequence of constant impulses $I_1$, $I_2$ etc. If now the creation of such an impulse sequence and the sparks 15 resulting therefrom result in a light appearance, the spectrum determined by means of the light analysis device 19 thereof is classified by means of the estimator 24 as not being significant, no reliable optical tissue analysis can be carried out based on this impulse sequence. In the embodiment according to FIG. 5, however, the mode catalog storage 30 is activated thereby that sends a respective signal to the clock 14b. This signal comprises either information about the individual impulse or a short impulse sequence $I_3$, $I_4$, $I_5$ that result in a light appearance having a spectrum that can be evaluated better. The resulting impulse sequence is illustrated in FIG. 6. While the mode desired by the surgeon requires a sequence of constantly high voltage impulses $I_1$, $I_2$, $I_6$, etc. with a repetition rate of, for example, 5 µs, the clock 14b is controlled to insert in repeating intervals, e.g. every 0.5 seconds, an intermediate impulse sequence Z into the treatment signal sequence $I_1$, $I_2$, $I_6$.

The intermediate impulse sequence Z can comprise one or multiple impulses $I_3$, $I_4$, $I_5$ that have similar or different amplitudes and that are output in equal or different intervals to the treatment signal impulses $I_1$, $I_2$, $I_6$ . . . $I_9$. The number, the intervals and the size of the intermediate impulses $I_3$ to $I_5$ are preferably defined thereby so that optimum significant spectra result. The time duration of the intermediate impulse sequence Z is preferably defined so short that the surgical effect expected from the treatment impulses $I_1$, $I_2$ as well as $I_6$ to $I_9$ . . . is not or only to a minor extent modified or even affected.

A theragnostic system according to the invention comprises a surgical station 10 and a storage and processing device 17 that contains a large amount of data in a suitable storage in which patient data and treatment data, e.g. in form of electrical and optical features E, O are combined. The electrical features E are derived from electrical parameters of the voltage and the current with which an instrument 11 is supplied. The optical features are derived from light of the spark 15 that is produced upon influencing the tissue 13. By combination of electrical features E and optical features O in a data collection, e.g. data base, that even contains additional features, such as tissue features and as an option patient characteristics, it can be automatically determined with high reliability whether the instrument influences benign or malign tissue. The prediction accuracy can be increased by machine learning in that histological data are added to the data sets in addition to the electrical features E and the optical features O. In a preferred embodiment these data are collected in a cloud 26 that is connected with many surgical stations 10. Therefore, in the cloud 26 data can be collected that have been created in different surgical stations 10.

REFERENCE SIGNS 10 surgical station
11 instrument 12 electrode
13 biological tissue
14 generator
14a impulse generator
$I_1, I_6 \ldots I_9$ treatment impulses
$I_3 \ldots I_5$ intermediate impulses
14b clock
TS clock signal
A amplitude signal
u treatment voltage
i treatment current
15 spark
E electrical feature
16 detection device for electrical feature E
17 storage and processing device
18 light receiving device
19 light analysis device
20 optical fiber
O optical feature
P patient identifier
T tissue identifier
21 mass storage
22 input unit
23 indication device
24 estimator
25 data remote connection
26 cloud
27 processing device
28 input device
29 feedback
30 mode catalog storage
Z intermediate impulse sequence

The invention claimed is:

1. A theragnostic system comprising:
at least one surgical station (10) that comprises:
  a light receiving device (18) for receiving light that is emitted from a spark (15) that is created between an electrode (12) of an electrosurgical instrument (11) and biological tissue (13);
  a light analysis device (19) that is configured to determine at least one optical feature (O) of the received light;
  a generator (14) for providing an electrical voltage (u) for supply of the electrosurgical instrument (11) and thereby for supply of the electrode (12) of the electrosurgical instrument (11) with electrical current (i);
  a detection device (16) for determination of at least one electrical feature (E),
  an output device (23); and
  a storage and processing device (17) that is configured to:
    determine a tissue label (L) based on the at least one optical feature (O), and if the at least one optical feature (O) is insufficient for a tissue identification, determine the tissue label (L) based on the at least one optical feature (O) and at least one electrical feature (E) or based on the at least one electrical feature (E) alone, and
    transmit the tissue label (L) to the output device (23) for output.

2. The theragnostic system according to claim 1, wherein the light analysis device (19) comprises a spectral analysis device that is configured to determine a spectrum, portions of the spectrum or parameters derived from the spectrum or from portions of the spectrum as the at least one optical feature (O).

3. The theragnostic system according to claim 2, wherein the light analysis device (19) or the storage and processing device (17) comprises or is connected with a quality estimator (24) for the spectrum, portions of the spectrum or parameters derived therefrom.

4. The theragnostic system according to claim 3, wherein the quality estimator is configured to determine a signal-to-noise distance of at least one spectral line (O1) or a spectral range (O1, O2).

5. The theragnostic system according to claim 3, wherein the storage and processing device (17) is configured to determine the tissue label (L) with reduced or without consideration of the at least one optical feature (O) based on the at least one electrical feature (E), if the spectrum does not have sufficient quality.

6. The theragnostic system according to claim 1, further comprising an input device (22, 28) configured to receive a tissue identifier (T) as an input, whereby the input device (22, 28) is connected with the storage and processing device (17) in order to transmit the tissue identifier (T) thereto.

7. The theragnostic system according to claim 1, wherein the storage and processing device (17) comprises a data collection in which a set of optical and electrical features (O, E) is assigned to at least one tissue label (L) respectively.

8. The theragnostic system according to claim 6, wherein the tissue identifier (T) is defined based on inputs made by the input device (22, 28).

9. The theragnostic system according to claim 1, wherein the storage and processing device (17) is part of the at least one surgical station (10).

10. The theragnostic system according to claim 1, wherein the generator (14) is controlled with regard to at least one operating parameter based on the at least one optical feature (O).

11. The theragnostic system according to claim 1, wherein the generator (14), if operated in a first operating mode (M1) in which the at least one optical feature (O) does not allow a reliable tissue identification, is operated at least for a short period in a second operating mode (M2) in which a tissue identification is possible based on the at least one optical feature.

12. The theragnostic system according to claim 1, wherein the theragnostic system comprises multiple surgical stations (10).

13. The theragnostic system according to claim 12, wherein a part (26) of the storage and processing device (17) is connected with the at least one surgical station (10) via a data transmission device (25).

14. The theragnostic system according to claim 1, wherein the storage and processing device (17) is connected with an input device (28) positioned external from the at least one surgical station (10).

15. A theragnostic method comprising:
receiving light emitting from a spark (15) that is created between an electrode (12) of an electrosurgical instrument (11) and biological tissue (13) by a light receiving device (18);
determining at least one optical feature (O) from the received light by a light analysis device (19);
generating with a generator (14) an electrical voltage (u) for supply of the electrosurgical instrument (11) and thereby for supply of the electrode (12) of the instrument (11) with electrical current (i);
determining at least one electrical feature (E) by a detection device (16);
determining a tissue characterization (L);

wherein determining the tissue characterization (L) is based on the at least one optical feature (O), or if the at least one optical feature (O) is insufficient for a tissue identification, determining the tissue characterization (L) is based on the at least one optical feature (O) and the at least one electrical feature (E), or is based on the at least one electrical feature (E) alone; and transmitting the tissue characterization (L) to an output device (23).

\* \* \* \* \*